UNITED STATES PATENT OFFICE 2,503,356

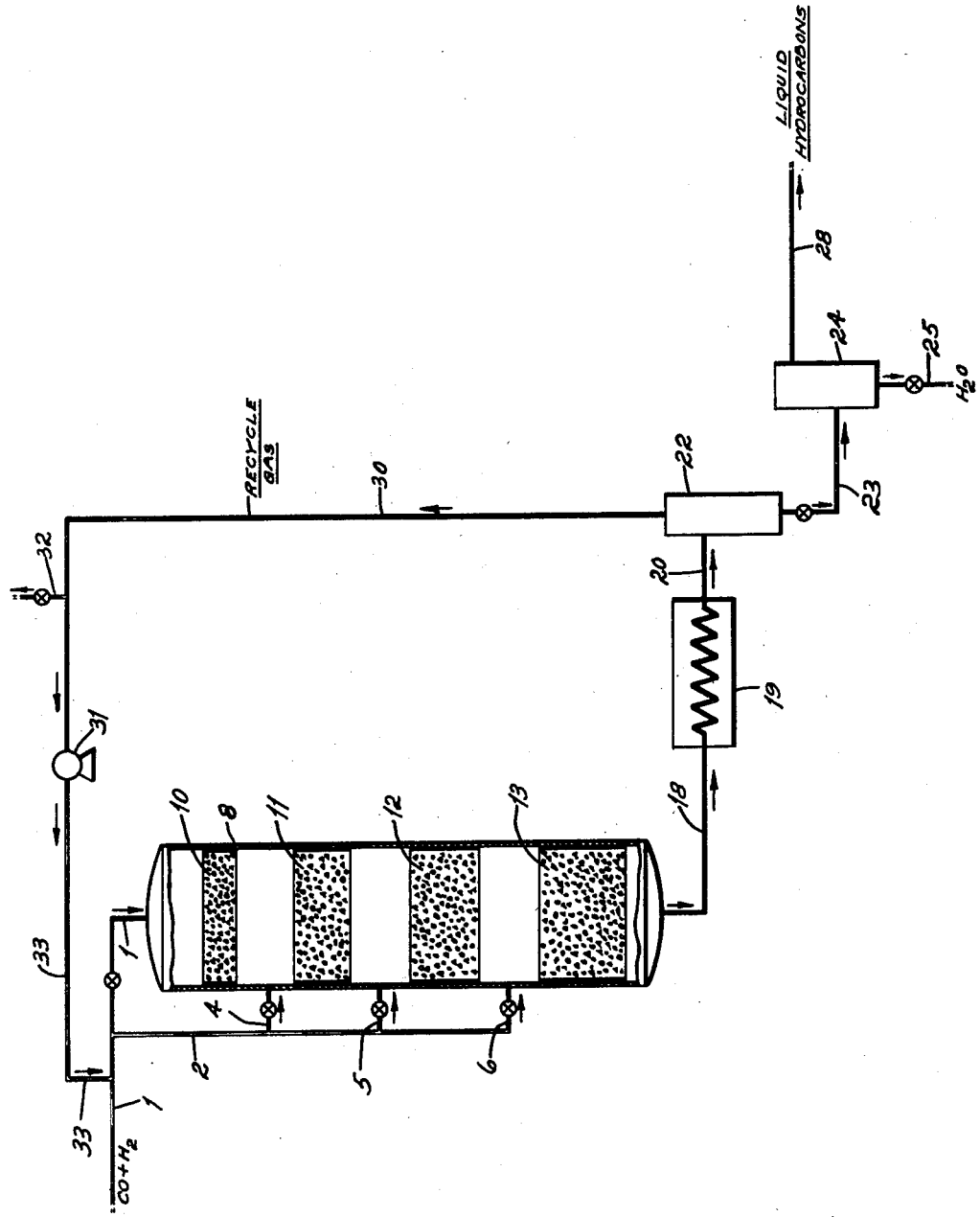

METHOD OF SYNTHESIZING HYDRO-CARBONS AND THE LIKE

Eugene E. Sensel and Alfred J. Millendorf, Beacon, and Roland A. Beck, Glenham, N. Y., assignors to The Texas Company, New York, N. Y., a corporation of Delaware Application July 1, 1946, Serial No. 680,830

2 Claims. (Cl. 260—449.6)

This invention relates to the catalytic conversion of a synthesis gas comprising mainly carbon monoxide and hydrogen into hydrocarbons, oxygenated hydrocarbons and the like.

The invention contemplates effecting the conversion of carbon monoxide and hydrogen into desired compounds by contacting synthesis gas with catalysts of different composition in successive stages. The composition of the catalysts is such that each possesses a different optimum conversion temperature. The catalysts of diverse composition are arranged so that the magnitude of the optimum conversion temperatures increases in the direction of synthesis gas flow. Exothermic heat liberated by the conversion of synthesis gas is utilized to some advantage by the method of this invention.

Optimum conversion, as used in the description of this invention, connotes the concept of the maximum yield of liquid hydrocarbons per unit of synthesis gas charged to the converter; this relationship is usually expressed as grams per cubic meter of charge gas. Thus, the optimum conversion temperature designates that temperature at which the greatest number of grams of liquid hydrocarbons per cubic meter of synthesis gas is obtained with a particular catalyst.

The invention has application in both fixed catalyst bed and in the various modifications of fluidized catalyst operations such as a fluid bed, a moving bed or a suspensoid type of conversion. In a fixed bed unit, layers of catalyst of different optimum conversion temperatures are supported one above the other with or without provision for cooling between layers. Advantageously the layers are not contiguous. A fluidized catalyst operation is effected in successive units, each unit containing a catalyst of different optimum conversion temperature maintained in a fluid state.

The method of this invention allows the utilization of simpler means of temperature control in the hydrogenation of carbon monoxide than are usually employed. Fixed bed operation ordinarily requires a multitude of cooling tubes disposed within the reactor and spaced less than about an inch apart. The problem of heat removal is not as acute in fluid units as in fixed bed operation because of increased heat transfer rates but still remains a major factor in engineering design. The method of this invention for the hydrogenation of carbon monoxide simplifies the problem of heat removal so that at least the number of cooling tubes or other devices for heat removal may be reduced and in some instances an elementary method of indirect heat exchange such as an annular cooling jacket may be employed.

There are a number of methods available whereby the composition of carbon monoxide-hydrogenation catalysts may be modified so as to produce catalysts of different optimum conversion temperatures. The metals of the iron group of the periodic table possess different optimum operating temperatures for the catalytic conversion of carbon monoxide and hydrogen into hydrocarbons or hydrocarbon derivatives; nickel has the lowest optimum conversion temperature and iron the highest. Consequently one expedient whereby catalysts of varying optimum operating temperatures may be employed is to prepare catalysts with different metals of the eighth group.

The effect of using different promoters, among which may be mentioned oxides of thorium, magnesium, manganese, zirconium, vanadium, etc., is to change the optimum operating temperature of catalysts prepared from a specific metal of the eighth group. Thus, variation of the promoters which are used with a cobalt catalyst provides catalysts of varying optimum conversion temperatures. The optimum conversion temperature may also be changed by changing the quantity of promoter incorporated in a catalyst.

In supported catalysts, mutation of the ratio of hydrogenating metal to catalyst carrier provides still another means of preparing catalysts of varying optimum conversion temperatures. It can be readily seen that there are numerous expedients available whereby catalysts of varying optimum operating temperatures may be prepared.

In employing the method of the invention for the hydrogenation of carbon monoxide, it is advantageous to increase successively the quantity of catalyst of specific optimum conversion temperature in each successive stage in the direction of flow of reactants. The catalyst of lowest optimum operating temperature which is first contacted by synthesis gas is present in the smallest amount. The quantity of catalyst in each successive stage is increased. Disposal of catalysts in this manner is advantageous because the greatest percentage of conversion takes place during initial contact of fresh synthesis gas with catalyst. The use of only a small quantity of catalyst of minimum conversion temperature in the stage where synthesis gas first contacts the catalyst prevents overheating of the initial layer where the greatest amount of conversion takes place. Since successively smaller amounts of conversion take place in succeeding stages, the quantity of catalyst in each succeeding stage is progressively increased.

Split feed injection of synthesis gas is also a useful expedient to minimize excessive overheating in the initial stages where synthesis gas first contacts the catalyst. Split feed injection is readily accomplished in the process of this invention by introducing portions of synthesis gas between successive catalyst stages.

Recycling of the normally gaseous constituents of the effluent from the final stage is advantageously employed in the method of this invention. Carbon dioxide present in the recycle stream helps to suppress the formation of carbon dioxide during the synthesis reaction, thereby making available more carbon for conversion into desired products. Moreover, the use of the recycle gas stream dilutes the reactor feed so that overheating in the stages of initial contact is minimized. Recycle ratios expressed as volume of recycle gas per volume of fresh synthesis gas of about 0.5:1 to 100:1 may be used; a recycle ratio of about 1:1 has proven to be advantageous.

When the method of the invention is adapted to fluidized catalyst operation, a plurality of fluid reactors containing catalysts whose optimum operating temperatures increase in the direction of gas flow are connected in series. Maintenance of equal fluidization along the vertical dimensions of each reactor in the series is thus simplified since only partial conversion of synthesis gas with a commensurate percentage of total volume contraction takes place in each reactor.

Reference will now be made to the accompanying drawing in order to describe the method of the invention more fully. The drawing presents an adaptation of the method of the invention to a fixed bed type of catalytic operation.

Referring to the drawing, synthesis gas comprising carbon monoxide and hydrogen is obtained from a source not shown through a pipe 1. Conventional means of synthesis gas preparation may be employed such as the controlled oxidation of methane with a limited quantity of oxygen or the water gas reaction. The molecular ratio of carbon monoxide to hydrogen may vary from about 1:1 to about 1:4 but a synthesis gas containing a 1:2 ratio is normally employed.

Synthesis gas may be preheated to a predetermined temperature and compressed to a predetermined pressure prior to its entry into a synthesis reactor; the means of heating and compression are conventional and are not shown. After reaction is under way, preheating of synthesis gas may be eliminated or at least substantially decreased.

There is added to the fresh synthesis gas in the pipe 1 a recycle gas comprising the normally gaseous constituents of the effluent from the synthesis conversion. The source of this recycle gas will be described in detail later. The total reactor feed comprises fresh synthesis gas and recycle gas. A recycle ratio of about one mol of fresh synthesis gas to one mol of recycle gas is usually employed.

Reactor feed comprising fresh synthesis gas and recycle gas is introduced into a reactor 8 through the pipe 1. While the total reactor feed may be introduced to the reactor 8 through the pipe 1, provision is advantageously made for employing split feed injection. To accomplish this end, the feed pipe 1 is connected with the manifold pipe 2 through which the reactor feed may be introduced at various places along the vertical dimensions of the fixed bed reactor 8 between the layers containing catalysts of successively incremented optimum conversion temperatures through pipes 4, 5 and 6 which connect with the manifold pipe 2.

The reactor 8 contains a plurality of catalysts of different composition and different optimum conversion temperatures which are disposed in non-contiguous layers. In the drawing, there are four catalyst layers illustrated which are designated by the numerals 10, 11, 12 and 13. It is contemplated that a larger number of catalyst layers, each formed of a catalyst of different composition may be employed, but in the interest of simplicity, only four such layers are illustrated.

The layers are arranged so that synthesis gas successively contacts catalysts of progressively higher optimum conversion temperature characteristics. In the initial layer 10, the optimum conversion temperature level of the catalyst may be about 350° to 370° F., for example, while the temperature level for each succeeding layer is from about 15° to 50° F. higher than that immediately preceding. This can be arranged by judiciously altering the catalyst composition. The catalyst layer 13 thus contains a catalyst whose optimum conversion temperature level is the highest of all the catalysts employed in the process.

The temperature gradient from the point of initial contact of synthesis gas with catalyst to the point of exit of the effluent from the reactor may be as much as 150° to 200° F. Spatial arrangement of catalysts according to optimum conversion temperatures may be correlated with the adiabatic temperature rise of the reactants in flowing through the reactor so that synthesis gas passing through the reactor continuously contacts a catalyst whose optimum conversion temperature corresponds to the temperature level of the synthesis gas.

It will be noticed that the depth of each succeeding catalyst layer increases in the direction of flow of reactants. The reason for gradually increasing the depth of succeeding catalyst layers in this manner through the reactor 8 is to prevent overheating in the layers of initial contact as has been explained previously.

The reactor 8 may be surrounded with a jacket, not shown, through which the cooling medium flows in indirect heat exchange with the gases present in the reactor. Indirect heat exchange in this manner is helpful in maintaining the desired temperature conditions within the reactor 8.

An effluent comprising the products of reaction and unreacted synthesis gas leaves the reactor 8 through a pipe 18 which leads to a cooler 19. In the cooler 19, the normally liquid products of the effluent are condensed. The toal effluent comprising gaseous and liquid constituents passes through a pipe 20 into a gas-liquid separator 22.

In the gas-liquid separator 22, normally gaseous constituents of the effluent are separated from condensed liquid components. Liquid products are discharged from the separator 22 through a pipe 23 which leads into another separator 24. In the separator 24, water and any materials dissolved therein are separated from liquid hydrocarbons. Water is discharged from the separator 24 through a pipe 25.

Liquid hydrocarbons leave the separator 24 through a pipe 28 through which hydrocarbons are led to further processing. Such processing may include separation of the liquid hydrocarbons into various fractions such as gasoline, gas oil, etc., in a conventional fractionation unit.

Returning to the normally gaseous constituents which are separated from the liquid products in the separator 22, they pass along a pipe 30 into a pump 31 in which they are raised to the desired reaction pressure prior to their use as recycle gas. A portion of this recycle stream may be vented through a vent 32 in order to be processed and in order to prevent accumulation of nitrogen in the system. Recycle gas at the desired pressure leaves the pump 31 through a pipe 33 through which it combines with fresh synthesis gas in the pipe 1 to form total reactor feed.

By way of example, but not by limitation, a conversion employing specified catalysts in accordance with the invention is described; in this instance, the desired products are liquid hydrocarbons in the gasoline range.

A reactor feed comprising equal volumes of fresh synthesis gas and recycle gas is introduced into the reactor 8 at a space velocity of about 200— space velocity being defined as the volume of gas per volume of catalyst per hour. The reactor feed is under atmospheric pressure and at a temperature of about 275° to 300° F. Approximately one-half of the total reactor feed is introduced into the reactor 8 through the pipe 1. The remaining half of the reactor feed passes through the manifold 2 and is introduced in approximately equal portions into the reactor through the pipes 4, 5 and 6.

In the layer 10, synthesis gas contacts a catalyst comprising nickel supported on Filter Cel and promoted by the oxides of manganese, uranium and thorium. This catalyst in the reduced state has an approximate composition as follows on a weight basis: 46 per cent metallic nickel, 45.5 per cent Filter Cel, 5 per cent manganese oxide, 2.5 per cent uranium oxide and 1 per cent thorium oxide. The optimum operating temperature of this catalyst is approximately 356° F., approximately 100 grams of liquid hydrocarbons per cubic meter of charge gas being obtained at this temperature. Synthesis gas is converted into hydrocarbons by contact with this catalyst liberating heat which raises the temperature of the gas stream which discharges from the layer 10.

In the free space between layers 10 and 11, the effluent from the layer 10 is supplemented by an additional portion of the reactor feed from the pipe 4. This space may be advantageously packed with a non-catalytic highly conductive metal which aids in heat transfer from the gas to a heat exchange medium which flows through the jacket surrounding the reactor 8. Alternatively cooling coils not shown may be inserted in the free space between the layers.

In the layer 11, synthesis gas contacts a supported cobalt catalyst whose composition on a weight basis may be approximately represented as follows: 32 per cent metallic cobalt, 64 per cent Filter Cel, 2 per cent magnesia and 2 per cent thoria. This catalyst contains no alkali metal content, precipitation of the cobalt and the promoters having been accomplished by ammonium carbonate which decomposes on heating. The optimum conversion temperature of this catalyst is about 390° F., which is approximately the temperature that is realized in this layer. With a cobalt catalyst of this composition, 150 grams of liquid hydrocarbon per cubic meter of charge gas were obtained at 392° F. Further conversion of the synthesis gas occurs in this layer liberating additional quantities of heat.

The effluent from the layer 11 is supplemented by a further quantity of synthesis gas through the pipe 5 before it enters the catalyst layer 12. In the layer 12, synthesis gas contacts another supported cobalt catalyst. This catalyst contains a considerable percentage of alkali metal and its composition on a weight basis may be approximately represented as follows: 31 per cent metallic cobalt, 63 per cent Filter Cel, 1.8 per cent magnesia, 1.5 per cent thoria and 1.7 per cent sodium carbonate. The optimum conversion temperature of this catalyst is around 430° F. which is the approximate temperature level maintained in the layer 12 by operation in accord with the method of the invention. With a cobalt catalyst of this composition, 120 grams of liquid hydrocarbons per cubic meter of charge gas are obtained at 430° F. Further heat is liberated by the conversion taking place in the layer 12. Since the catalyst contains 31 weight per cent metallic cobalt and 1.7 weight per cent sodium carbonate, the sodium carbonate content is approximately 5.5 weight per cent based on the weight of the metallic cobalt.

The gas issuing from the layer 12 is further supplemented by a portion of synthesis gas entering the reeactor 8 through the pipe 6. This combined gas stream then contacts a supported iron catalyst in the catalyst layer 13. The composition of the supported iron catalyst on a weight basis may be approximately represented as follows: 40 per cent iron, 50 per cent alumina (H–40), 9 per cent copper, one per cent potassia. The optimum conversion temperature of this catalyst is around 480° F. With an iron catalyst of this composition, 95 grams of liquid hydrocarbons per cubic meter of charge gas are obtained at 480° F. This temperature is approximately that attained in the layer 13.

Further conversion of synthesis gas takes place in the layer 13.

An effluent containing the products of the conversion issues from the reactor 8 through the pipe 18 and is separated into gaseous and liquid components. From the liquid products, liquid hydrocarbons are separated in a yield approximating 140 grams of liquid hydrocarbons per cubic meter of fresh synthesis gas.

The recycle gas stream contains a high percentage of hydrogen and carbon dioxide. The presence of large percentages of these two components in the reactor feed suppresses the formation of carbon dioxide by the water-gas shift reaction during the conversion of carbon monoxide and hydrogen into desired compounds.

The method of the invention may be readily adapted to conversion of synthesis gas by means of a fluidized catalyst operation. In the fluidized bed modification of the fluid technique, the plurality of separate reactors is connected both in series and in parallel. By operation in this fashion, the effluent from a preceding stage as well as a portion of the fresh feed are introduced into each stage.

Each fluid reactor unit contains a catalyst of different composition; the reactors are arranged so that synthesis gas successively contacts a catalyst of increasing optimum conversion temperature characteristics. It is advantageous to use unsupported catalysts in a fluidized system because they are less subject to attrition than are supported catalysts.

As is well known in a fluid bed operation, the catalysts of varying composition are maintained in a state of constant vibratory motion in each separate reactor without substantial entrainment of catalyst particles in the effluent leaving each reactor. The catalyst may be maintained in the fluidized state by introducing reactants into the reactor at a linear velocity in the range of 0.5 to 2 feet per second measured at conversion conditions of temperature and pressure; normally a linear velocity of one foot per second is employed.

Conducting the conversion of synthesis gas into liquid hydrocarbons in a series of fluid reactors by the method of this invention allows the simplification of the means of indirect heat exchange used to stabilize the temperature within the desired range. The number of bayonet tubes required may be substantially reduced or eliminated entirely in favor of an external cooling jacket.

The invention has been described as used in a fixed bed operation in which conversion is directed towards the formation of liquid hydrocarbons in the gasoline range. It is contemplated that the invention might equally as well be employed in the conversion in which oxygenated hydrocarbons were the objective of the conversion.

It is reiterated that the method of the invention may be employed in all forms of fluidized operation, such as a suspensoid operation or moving bed catalyst system.

The method of the invention is also adaptable to other exothermic conversions in which the conversion may be effected by a variety of catalysts which have divergent optimum conversion temperatures.

Obviously many modifications and variations of the invention, as hereinbefore set forth, may be made without departing from the spirit and scope thereof and, therefore, only such limitations should be imposed as are indicated in the appended claims.

We claim:

1. In a process for the production of normally liquid hydrocarbons and oxygenated organic compounds from carbon monoxide and hydrogen, the improvement which comprises passing a reactant mixture of carbon monoxide and hydrogen at a temperature of about 390° F. into contact with a catalyst consisting essentially of cobalt in association with a minor proportion of thoria and essentially free from alkali metal compounds, and passing effluent from said catalyst comprising unreacted carbon monoxide and hydrogen at a temperature of about 430° F. into contact with additional catalyst consisting essentially of metallic cobalt in association with a minor proportion of thoria and containing about 5.5 per cent sodium carbonate by weight based on the weight of the metallic cobalt.

2. A process as defined in claim 1 wherein the contact time between the reactant mixture and the alkali metal-free cobalt catalyst is such that the heat liberated by the reaction during the passage of the reactant gases therethrough is sufficient to increase the temperature of the reactant stream to substantially the temperature required for reaction in the presence of the catalyst comprising cobalt and sodium carbonate.

EUGENE E. SENSEL.
ALFRED J. MILLENDORF.
ROLAND A. BECK.

REFERENCES CITED

The following references are of record in the file of this patent:

UNITED STATES PATENTS

| Number | Name | Date |
|---|---|---|
| 1,711,856 | Prudhomme | May 7, 1929 |
| 1,741,306 | Jaeger | Dec. 31, 1929 |
| 2,142,678 | Porter | Jan. 3, 1939 |
| 2,244,573 | Roberts, Jr. | June 3, 1941 |
| 2,256,622 | Murphree et al. | Sept. 23, 1941 |
| 2,279,153 | Wilcox | Apr. 7, 1942 |
| 2,417,164 | Huber, Jr. | Mar. 11, 1947 |
| 2,450,500 | Clark | Oct. 5, 1948 |

OTHER REFERENCES

Ellis, "Chemistry of Petroleum Derivatives," vol. II, page 1226, Reinhold, N. Y. (1937).